(12) United States Patent
Lee (10) Patent No.: US 8,577,027 B1
(45) Date of Patent: Nov. 5, 2013

(54) ADVANCED CRYPTOGRAPHIC METHOD OF MULTILAYER DIFFUSION IN MULTIDIMENSION

(71) Applicant: Chiou-Haun Lee, Taichung (TW)

(72) Inventor: Chiou-Haun Lee, Taichung (TW)

( * ) Notice: Subject to any disclaimer, the term of this patent is extended or adjusted under 35 U.S.C. 154(b) by 0 days.

(21) Appl. No.: 13/623,215

(22) Filed: Sep. 20, 2012

(51) Int. Cl.
*H04K 1/00* (2006.01)

(52) U.S. Cl.
USPC .................. 380/28; 380/30; 380/37

(58) Field of Classification Search
USPC ............ 380/28, 30, 37, 42; 713/189; 708/401
See application file for complete search history.

(56) References Cited

U.S. PATENT DOCUMENTS

| 2002/0016773 A1* | 2/2002 | Ohkuma et al. ................. 705/50 |
| 2007/0003060 A1* | 1/2007 | Lee .............................. 380/259 |
| 2007/0189512 A1* | 8/2007 | Lee ............................... 380/28 |

* cited by examiner

*Primary Examiner* — Samson Lemma (57) ABSTRACT

The invention is related to working with variable diffusion functions on a multidimensional diffusion-area (plaintext/ciphertext); every diffusion function run in a cycle times, wherein repeating one certain times on the plaintext to get a ciphertext, and afterward, repeating the other times on the ciphertext to recover the plaintext, is performed in sequence to complete the encryption and the decryption. According to FIG. 1, the system comprises of: inputting a plaintext in encryption or a ciphertext in decryption 100; reading every password segment in order, forward in encryption or backward in decryption 200; and further, converting the plaintext dimensions by the password segment 300; implementing the diffusion function of Point 410, Block 420 or Frame 430, repeated $T_E$ times in encryption, $T_D$ times in decryption 400; going back to 200 until completing all password segments 500, and outputting the ciphertext in encryption or the plaintext in decryption 600.

3 Claims, 6 Drawing Sheets

4313: $AF(\dot{C}_4)$ $$\begin{bmatrix} a_{11} & a_{12} & a_{13} \\ a_{21} & a_{22} & a_{23} \\ a_{31} & a_{32} & a_{33} \end{bmatrix} \oplus \begin{bmatrix} 0 & 0 & 0 \\ a_{11} & a_{12} & a_{13} \\ a_{21} & a_{22} & a_{23} \end{bmatrix} \oplus \begin{bmatrix} 0 & a_{11} & a_{12} \\ 0 & a_{21} & a_{22} \\ 0 & a_{31} & a_{32} \end{bmatrix} \oplus \begin{bmatrix} s_{11} & s_{12} & s_{13} \\ s_{21} & s_{22} & s_{23} \\ s_{31} & s_{32} & s_{33} \end{bmatrix}$$

4313: $AF(\dot{C}_3)$ $$\begin{bmatrix} a_{51} & a_{52} & a_{53} \\ a_{61} & a_{62} & a_{63} \\ a_{71} & a_{72} & a_{73} \\ a_{81} & a_{82} & a_{83} \end{bmatrix} \oplus \begin{bmatrix} a_{61} & a_{62} & a_{63} \\ a_{71} & a_{72} & a_{73} \\ 0 & 0 & 0 \\ a_{71} & a_{72} & a_{73} \end{bmatrix} \oplus \begin{bmatrix} 0 & a_{51} & a_{52} \\ 0 & a_{61} & a_{62} \\ 0 & a_{71} & a_{72} \\ 0 & a_{81} & a_{82} \end{bmatrix} \oplus \begin{bmatrix} 0 & 0 & 0 \\ 0 & 0 & 0 \\ 0 & 0 & 0 \\ s_{11} & s_{12} & s_{13} \\ s_{21} & s_{22} & s_{23} \end{bmatrix}$$

4313: $AF(\dot{C}_2)$ $$\begin{bmatrix} a_{55} & a_{56} & a_{57} & a_{58} \\ a_{65} & a_{66} & a_{67} & a_{68} \\ a_{75} & a_{76} & a_{77} & a_{78} \\ a_{85} & a_{86} & a_{87} & a_{88} \end{bmatrix} \oplus \begin{bmatrix} a_{65} & a_{66} & a_{67} & a_{68} \\ a_{75} & a_{76} & a_{77} & a_{78} \\ 0 & 0 & 0 & 0 \\ a_{75} & a_{76} & a_{77} & a_{78} \end{bmatrix} \oplus \begin{bmatrix} a_{56} & a_{57} & 0 & a_{57} \\ a_{66} & a_{67} & 0 & a_{67} \\ a_{76} & a_{77} & 0 & a_{77} \\ a_{86} & a_{87} & 0 & a_{87} \end{bmatrix} \oplus \begin{bmatrix} 0 & 0 & 0 & 0 \\ 0 & 0 & 0 & 0 \\ 0 & 0 & s_{11} & s_{12} \\ 0 & 0 & s_{21} & s_{22} \end{bmatrix}$$

4313: $AF(\dot{C}_1)$ $$\begin{bmatrix} a_{15} & a_{16} & a_{17} & a_{18} \\ a_{25} & a_{26} & a_{27} & a_{28} \\ a_{35} & a_{36} & a_{37} & a_{38} \end{bmatrix} \oplus \begin{bmatrix} 0 & 0 & 0 & 0 \\ a_{15} & a_{16} & a_{17} & a_{18} \\ a_{25} & a_{26} & a_{27} & a_{28} \end{bmatrix} \oplus \begin{bmatrix} a_{16} & a_{17} & 0 & a_{17} \\ a_{26} & a_{27} & 0 & a_{27} \\ a_{36} & a_{37} & 0 & a_{37} \end{bmatrix} \oplus \begin{bmatrix} 0 & 0 & s_{11} & s_{12} \\ 0 & 0 & s_{21} & s_{22} \\ 0 & 0 & s_{31} & s_{32} \end{bmatrix}$$

4313: $\{A_x(p_1)\}$ $$\begin{bmatrix} a_{31} & a_{32} & a_{33} & a_{34} & a_{35} & a_{36} & a_{37} & a_{38} \end{bmatrix} \oplus$$
$$\begin{bmatrix} a_{41} & a_{42} & a_{43} & a_{44} & a_{45} & a_{46} & a_{47} & a_{48} \end{bmatrix} \oplus \begin{bmatrix} a_{51} & a_{52} & a_{53} & a_{54} & a_{55} & a_{56} & a_{57} & a_{58} \end{bmatrix}$$

4313: $\{A_y(p_2)\}$ $$\begin{bmatrix} a_{13} & a_{23} & a_{33} & a_{43} & a_{53} & a_{63} & a_{73} & a_{83} \end{bmatrix} \oplus$$
$$\begin{bmatrix} a_{14} & a_{24} & a_{34} & a_{44} & a_{54} & a_{64} & a_{74} & a_{84} \end{bmatrix} \oplus \begin{bmatrix} a_{15} & a_{25} & a_{35} & a_{45} & a_{55} & a_{65} & a_{75} & a_{85} \end{bmatrix}$$

FIG. 6

$$4313: \hat{A}F(\hat{C}_4)$$

$$\begin{bmatrix} a_{11} & a_{12} & a_{13} \\ a_{21} & a_{22} & a_{23} \\ a_{31} & a_{32} & a_{33} \end{bmatrix} \oplus \begin{bmatrix} 0 & 0 & 0 \\ 0 & 0 & 0 \\ a_{11} & a_{12} & a_{13} \end{bmatrix} \oplus \begin{bmatrix} 0 & 0 & a_{11} \\ 0 & 0 & a_{21} \\ 0 & 0 & a_{31} \end{bmatrix} \oplus \begin{bmatrix} s_{11} & s_{12} & s_{13} \\ s_{21} & s_{22} & s_{23} \\ s_{31} & s_{32} & s_{33} \end{bmatrix}$$

$$4313: \hat{A}F(\hat{C}_3)$$

$$\begin{bmatrix} a_{61} & a_{62} & a_{63} \\ a_{71} & a_{72} & a_{73} \\ a_{81} & a_{82} & a_{83} \end{bmatrix} \oplus \begin{bmatrix} 0 & 0 & 0 \\ 0 & 0 & 0 \\ a_{61} & a_{62} & a_{63} \end{bmatrix} \oplus \begin{bmatrix} 0 & 0 & a_{61} \\ 0 & 0 & a_{71} \\ 0 & 0 & a_{81} \end{bmatrix} \oplus \begin{bmatrix} 0 & 0 & 0 \\ s_{11} & s_{12} & s_{13} \\ s_{21} & s_{22} & s_{23} \end{bmatrix}$$

$$4313: \hat{A}F(\hat{C}_2)$$

$$\begin{bmatrix} a_{66} & a_{67} & a_{68} \\ a_{76} & a_{77} & a_{78} \\ a_{86} & a_{87} & a_{88} \end{bmatrix} \oplus \begin{bmatrix} 0 & 0 & 0 \\ 0 & 0 & 0 \\ a_{66} & a_{67} & a_{68} \end{bmatrix} \oplus \begin{bmatrix} 0 & 0 & a_{66} \\ 0 & 0 & a_{76} \\ 0 & 0 & a_{86} \end{bmatrix} \oplus \begin{bmatrix} 0 & 0 & 0 \\ 0 & s_{11} & s_{12} \\ 0 & s_{21} & s_{22} \end{bmatrix}$$

$$4313: \hat{A}F(\hat{C}_1)$$

$$\begin{bmatrix} a_{16} & a_{17} & a_{18} \\ a_{26} & a_{27} & a_{28} \\ a_{36} & a_{37} & a_{38} \end{bmatrix} \oplus \begin{bmatrix} 0 & 0 & 0 \\ 0 & 0 & 0 \\ a_{16} & a_{17} & a_{18} \end{bmatrix} \oplus \begin{bmatrix} 0 & 0 & a_{16} \\ 0 & 0 & a_{26} \\ 0 & 0 & a_{36} \end{bmatrix} \oplus \begin{bmatrix} 0 & s_{11} & s_{12} \\ 0 & s_{21} & s_{22} \\ 0 & s_{31} & s_{32} \end{bmatrix}$$

$$4313: \{\hat{A}_{\hat{x}}(\hat{p}_1)\}$$

$$\begin{bmatrix} a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \end{bmatrix} \oplus$$

$$\begin{bmatrix} a_{41} & a_{42} & a_{43} & a_{44} & a_{45} & a_{46} & a_{47} & a_{48} \\ a_{51} & a_{52} & a_{53} & a_{54} & a_{55} & a_{56} & a_{57} & a_{58} \end{bmatrix} \oplus \begin{bmatrix} a_{61} & a_{62} & a_{63} & a_{64} & a_{65} & a_{66} & a_{67} & a_{68} \\ a_{71} & a_{72} & a_{73} & a_{74} & a_{75} & a_{76} & a_{77} & a_{78} \end{bmatrix}$$

$$4313: \{\hat{A}_{\hat{y}}(\hat{p}_2)\}$$

$$\begin{bmatrix} a_{12} & a_{22} & a_{32} & a_{42} & a_{52} & a_{62} & a_{72} & a_{82} \\ a_{13} & a_{23} & a_{33} & a_{43} & a_{53} & a_{63} & a_{73} & a_{83} \end{bmatrix} \oplus$$

$$\begin{bmatrix} a_{14} & a_{24} & a_{34} & a_{44} & a_{54} & a_{64} & a_{74} & a_{84} \\ a_{15} & a_{25} & a_{35} & a_{45} & a_{55} & a_{65} & a_{75} & a_{85} \end{bmatrix} \oplus \begin{bmatrix} a_{16} & a_{26} & a_{36} & a_{46} & a_{56} & a_{66} & a_{76} & a_{86} \\ a_{17} & a_{27} & a_{37} & a_{47} & a_{57} & a_{67} & a_{77} & a_{87} \end{bmatrix}$$

ADVANCED CRYPTOGRAPHIC METHOD OF MULTILAYER DIFFUSION IN MULTIDIMENSION

The application is a continuation in part of the prior USPTO patent application titled "A Cryptographic Method of Multilayer Diffusion in Multidimension" filed on Mar. 18, 2010, application Ser. No. 12/726,833, which is incorporated herein by reference in its entirety.

TECHNICAL FIELD

The invention is related to working with variable diffusion functions on a multidimensional diffusion-area (plaintext/ciphertext); every diffusion function run in a cycle times, wherein repeating one certain times on the plaintext to get a ciphertext, afterward, repeating the other times on the ciphertext to recover the plaintext, is performed in sequence to complete the encryption and the decryption. Through at least one combination of point-diffusion, block-diffusion or frame-diffusion, the invention provides not only with a simpler multi-dimension calculation, but also with a higher security level.

BACKGROUND ART

The Applicant's following patent application is related to the invention and is incorporated herein by reference: "A Cryptographic Method of Multilayer Diffusion in Multidimension", application Ser. No. 12/726,833, filed Mar. 18, 2010.

In the prior art, such as DES (Data Encryption Standard) and AES (Advanced Encryption Standard), the password only works for repeatedly mixing the plaintext. On the contrary, being able to set off any diffusion function, the password in the present invention may be taken as a crypto machine to randomly agitate the plaintext.

SUMMARY OF INVENTION

Figure 1:
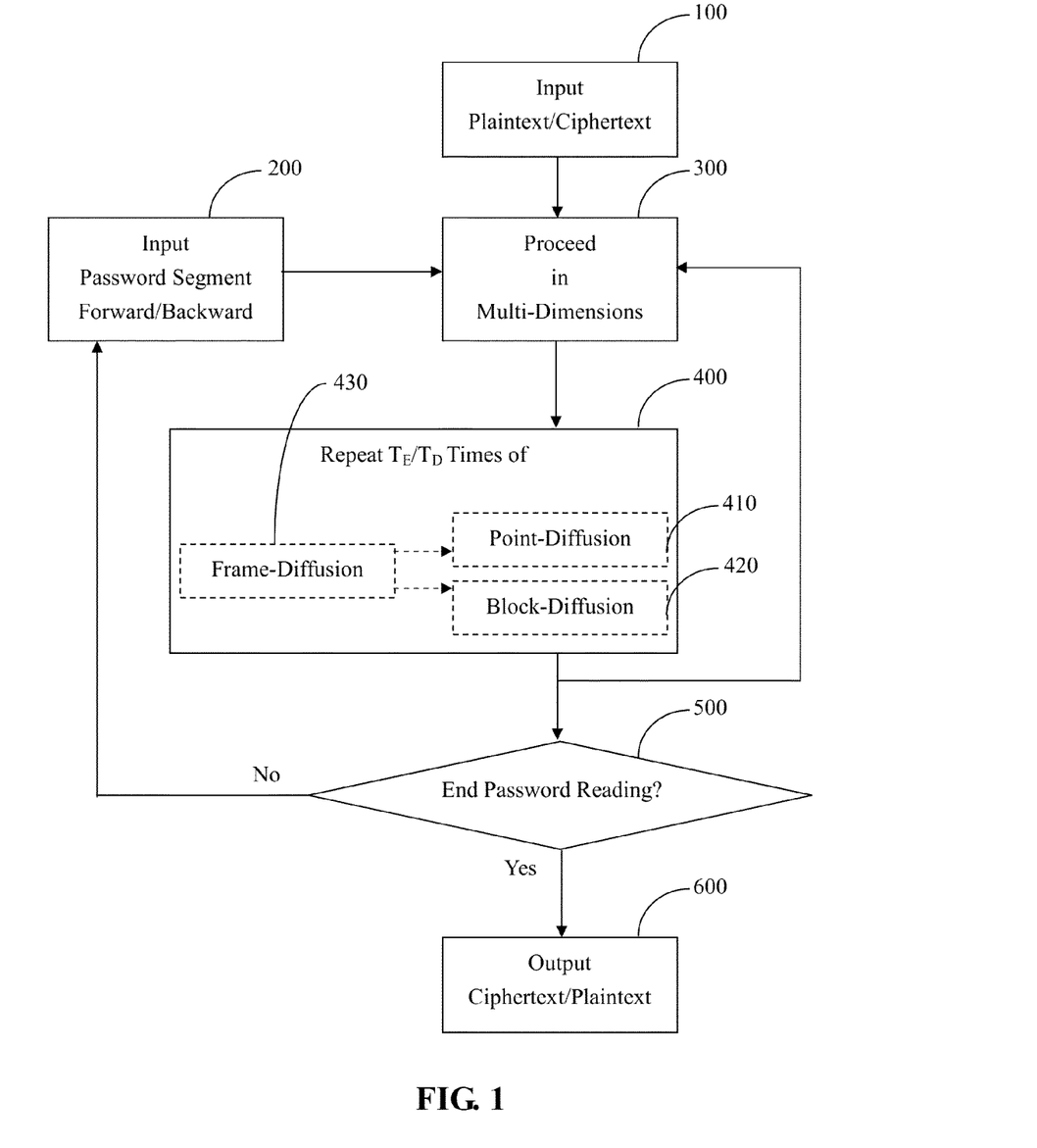
FIG. 1 is an exemplary flowchart in accordance with the present invention.

According to FIG. 1, the system comprises of: inputting a plaintext in encryption or a ciphertext in decryption 100; reading every password segment in order, forward in encryption or backward in decryption 200; and further, converting the plaintext dimensions by the password segment 300; implementing the diffusion function of Point 410, Block 420 or Frame 430, repeated $T_E$ times in encryption, $T_D$ times in decryption 400; going back to 200 until completing all password segments 500, and outputting the ciphertext in encryption or the plaintext in decryption 600.

Notation of Point-Diffusion:

A: a n-dimension diffusion-area, wherein A is a $d_1 \times d_2 \times \ldots \times d_n$ binary matrix and includes a diffusion-center $\dot{P}$ at the coordinates $(p_1, p_2, \ldots p_n)$.

S: a n-dimension medium, wherein S is a $s_1 \times s_2 \times \ldots \times s_n$ binary matrix and includes an anchor-point $\dot{S}$ at the coordinates $(s_1, s_2, \ldots, s_n)$.

$AF(\dot{P})$: A performs the function of point-diffusion at position $\dot{P}$, wherein S overlaps A by anchoring $\dot{S}$ to $\dot{P}$, and further, $$AF(\dot{P}) = AF(p_1, p_2, \ldots, p_n) = A \oplus Ad_{1p} \oplus Ad_{2p} \oplus \ldots \oplus Ad_{np} \oplus S;$$

$$Ad_{ip} = [A_{d_i}(2), \ldots, A_{d_i}(p_i), A_{d_i}(0), A_{d_i}(p_i), \ldots, A_{d_i}(d_i-1)];$$

$AF(p_1, p_2^t, \ldots, p_n)$: A repeats to perform the function of point-diffusion t times.

T: a diffusion-cycle, wherein $AF(p_1, p_2^T, \ldots, p_n) = A$, letting $T = 2^{V+1}$, $V = \lceil \log_2 v \rceil$, $v = \max(d_1, d_2, \ldots, d_n)$.

Notation of Block-Diffusion:

B: a n-dimension unit-block, wherein B is a $u_1 \times u_2 \times \ldots \times u_n$ binary matrix and includes an anchor-point $\dot{B}$ at the coordinates $(b_1, b_2, \ldots, b_n)$.

$\hat{A}F(\hat{P})$: $\hat{A}$ performs the function of block-diffusion, wherein $\dot{B}$ anchors to $\dot{P}$ and thus A is divided by B into $\hat{A}$ with $\hat{d}_1 \times \hat{d}_2 \times \ldots \times \hat{d}_n$ and $\dot{P}$ is arranged by B unit to $\hat{P}$ at the coordinates $(\hat{p}_1, \hat{p}_2, \ldots \hat{p}_n)$, wherein $\hat{d}_i = \lceil (p_i - b)/u_i \rceil + \lceil (d_i - p_i + b_i)/u_i \rceil$ and $\hat{p}_i = \lceil (p_i - b_i)/u_i \rceil + 1$, and further, $$\hat{A}F(\hat{p}_1, \hat{p}_2, \ldots, \hat{p}_n) = \hat{A} \oplus \hat{A}\hat{d}_{1p} \oplus \hat{A}\hat{d}_{2p} \oplus \ldots \oplus \hat{A}\hat{d}_{np} \oplus S;$$

$$\hat{A}\hat{d}_{ip} = [\hat{A}_{\hat{d}_i}(2), \ldots, \hat{A}_{\hat{d}_i}(\hat{p}_i), \hat{A}_{\hat{d}_i}(0), \hat{A}_{\hat{d}_i}(\hat{p}_i), \ldots, \hat{A}_{\hat{d}_i}(\hat{d}_i-1)];$$

$\hat{A}F(\hat{p}_1, \hat{p}_2^t, \ldots, \hat{p}_n)$: $\hat{A}$ repeats to perform the function of block-diffusion t times.

T: a diffusion-cycle, wherein $\hat{A}F(\hat{p}_1, \hat{p}_2^T, \ldots \hat{p}_n) = A$, letting $T = 2^{V+1}$, $V = \lceil \log_2 v \rceil$, $v = \max(\lceil d_i/b_i \rceil, 1 \leq i \leq n)$.

Notation of Frame-Diffusion:

F: a n-dimension frame, wherein F is a $w_1 \times w_2 \times \ldots \times w_n$ binary matrix and includes an anchor-point $\dot{F}$ at the coordinates $(f_1, f_2, \ldots, f_n)$ and corner-points $\dot{C}_k$ at the coordinates $(c_{k1}, c_{k2}, \ldots, c_{kn})$, where $1 \leq k \leq 2^n$.

$A\widehat{F}(\dot{P})$: A performs the frame function of point-diffusion, wherein F pastes to A by anchoring $\dot{F}$ to $\dot{P}$, and further, $$A\widehat{F}(\dot{P}) = A\widehat{F}(p_1, p_2, \ldots, p_n) = \sum_{k=1}^{2^n} AF(\dot{C}_k) \oplus \sum_{i=1}^{n} \{A_{d_i}(p_i)\},$$

wherein A is divided into $2^n$ diffusion subareas, in which every subarea, every axis limited in $(1 \sim p_i - 1)$ or $(p_i + 1 \sim d_i)$, is performed the point-diffusion $AF(\dot{C}_k)$ at a different position $\dot{C}_k + \dot{P} - \dot{F}$; and further, every $\{A_{d_i}(p_i)\} = A_{d_i}(p_{i-1}) \oplus A_{d_i}(p_i) \oplus A_{d_i}(p_{i+1})$.

$\hat{A}\widehat{F}(\hat{P})$: $\hat{A}$ performs the frame function of block-diffusion, wherein F pastes to $\hat{A}$ by anchoring $\dot{F}$ to $\dot{P}$, and further, $$\hat{A}\widehat{F}(\hat{P}) = \hat{A}\widehat{F}(\hat{p}_1, \hat{p}_2, \ldots, \hat{p}_n) = \sum_{k=1}^{2^n} \hat{A}F(\hat{C}_k) \oplus \sum_{i=1}^{n} \{\hat{A}_{\hat{d}_i}(\hat{p}_i)\},$$

wherein $\hat{A}$ is divided into $2^n$ diffusion subareas, in which every subarea, every axis limited in $(1 \sim \hat{p}_i - 1)$ or $(\hat{p}_i + 1 \sim \hat{d}_i)$, is performed the block-diffusion $\hat{A}F(\hat{C}_k)$ at a different position $\hat{C}_k + \hat{P} - \hat{F}$, where $\hat{c}_i = \lceil (c_i - b_i)/u_i \rceil + 1$, $\hat{f}_i = \lceil (f_i - b_i)/u_i \rceil + 1$, every $\{\hat{A}_{\hat{d}_i}(\hat{p}_i)\} = \hat{A}_{\hat{d}_i}(\hat{p}_{i-1}) \oplus \hat{A}_{\hat{d}_i}(\hat{p}_i) \oplus \hat{A}_{\hat{d}_i}(\hat{p}_{i+1})$.

Figure 2:
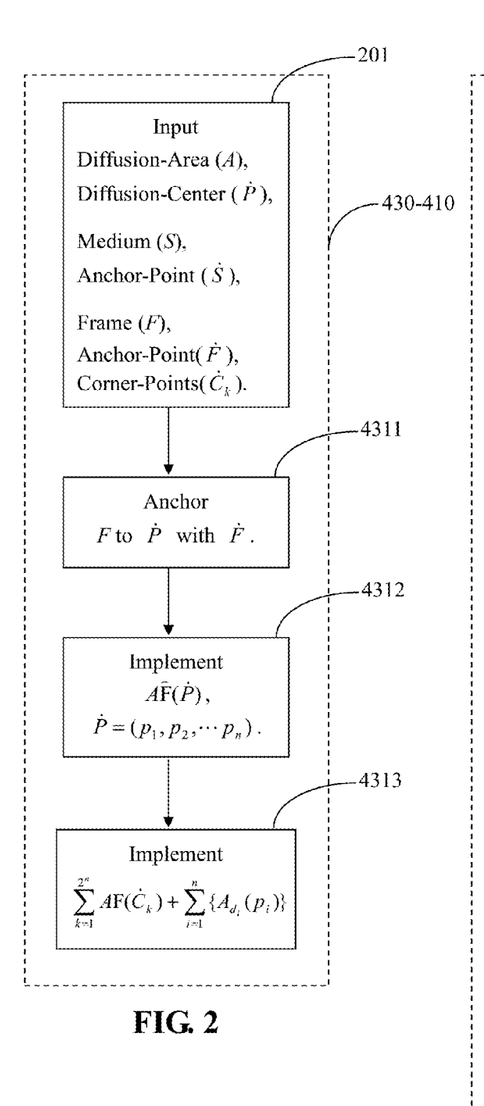
FIG. 2 is an exemplary detailed flowchart, frame diffusion of FIG. 1, adapted to run the frame function with point-diffusion.

Frame Function with Point-Diffusion:

According to FIG. 2, from FIG. 1, 430 combined with 410, the flow chart comprises of: reading a diffusion-area A (plaintext/ciphertext) with a diffusion-center $\dot{P}$, a medium S with an anchor-point $\dot{S}$, and a frame F with an anchor-point $\dot{F}$ and $2^n$ corner-points $\dot{C}_k$ 201; anchoring the frame to the diffusion-center with its anchor-point 4311; implementing the frame function of point-diffusion $A\bar{F}$ ($p_1, p_2, \ldots p_n$) 4312; thus, further implementing the point-diffusions $AF(c_{k1}, c_{k2}, \ldots, c_{kn})$, $1 \le k \le 2^n$, and $A_{d_i}(p_i)$, $1 \le i \le n$ 4313.

Figure 4:
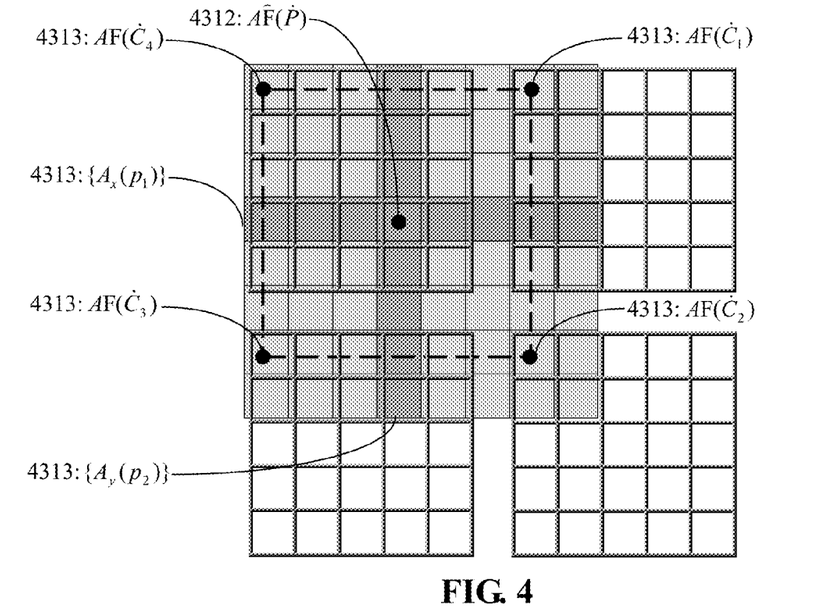
FIG. 4 is an exemplary block diagram in accordance with FIG. 2 adapted for two-dimensions.

For an example as FIG. 4, A is a size of 8×8 with $\dot{P}$ at (4, 4), S is a size of 5×5 with $\dot{S}$ at (1, 1), and F is a size of 7×7 with $\dot{F}$ at (4, 4) and $\dot{C}_1$ (1, 7), $\dot{C}_2$ at (7, 7), $\dot{C}_3$ at (7, 1), $\dot{C}_4$ at (1, 1) 201; anchoring F to $\dot{P}$ (4, 4) with $\dot{F}$ (4, 4) 4311; correspondingly, pasting every $\dot{C}_k$ to A and implementing $A\bar{F}$ (4, 4) 4312; thus, further implementing $AF(1, 7)$, $AF(7, 7)$, $AF(7, 1)$ and $AF(1, 1)$ (may refer application Ser. No. 12/726,833, page 3-4.), $\{A_x(4)\}$ and $\{A_y(4)\}$ 4313, where calculations in detail are shown on FIG. 6.

Figure 3:
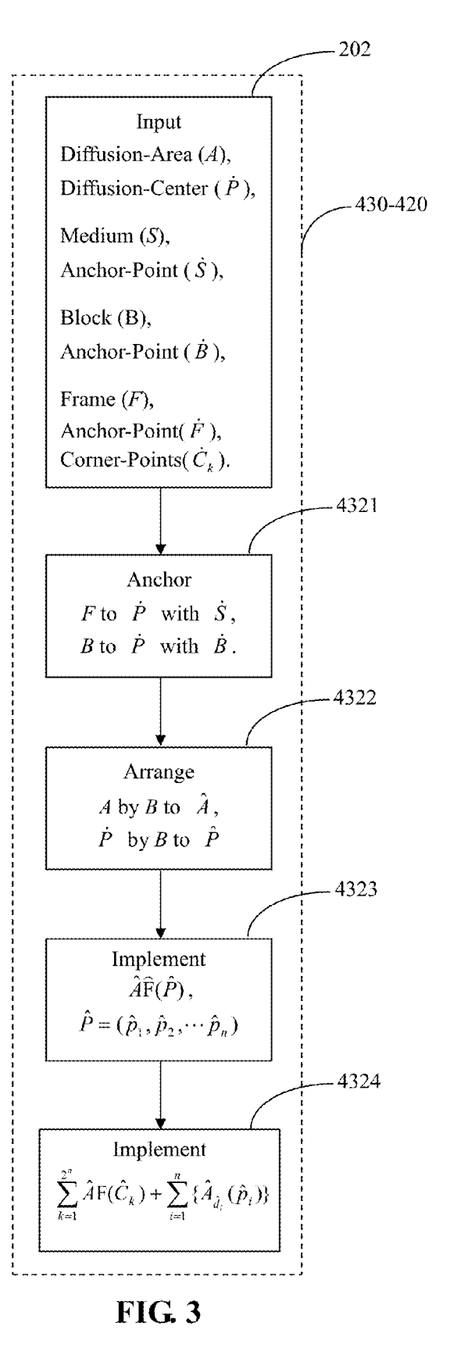
FIG. 3 is an exemplary detailed flowchart, frame diffusion of FIG. 1, adapted to run the frame function with block-diffusion.

Frame Function with Block-Diffusion:

According to FIG. 3, from FIG. 1, 430 combined with 420, the flow chart comprises of: reading a diffusion-area A (plaintext/ciphertext) with a diffusion-center $\dot{P}$, a medium S with an anchor-point $\dot{S}$, a unit-block B with an anchor-point $\dot{B}$, and a frame F with an anchor-point $\dot{F}$ and $2^n$ corner-points $\dot{C}_k$ 202; anchoring the frame and the unit-block to the diffusion-center with their own anchor-point 4321; arranging the diffusion-area and its diffusion-center by the unit-block 4322; implementing the frame function of block-diffusion $\hat{A}\hat{F}$ ($\hat{p}_1, \hat{p}_2, \ldots, \hat{p}_n$) 4323; thus, further implementing the block-diffusions $\hat{A}F(\hat{c}_{k1}, \hat{c}_{k2}, \ldots, \hat{c}_{kn})$, $1 \le k \le 2^n$, and $\hat{A}_{d_i}(\hat{p}_i)$, $1 \le i \le n$ 4324.

Figure 5:
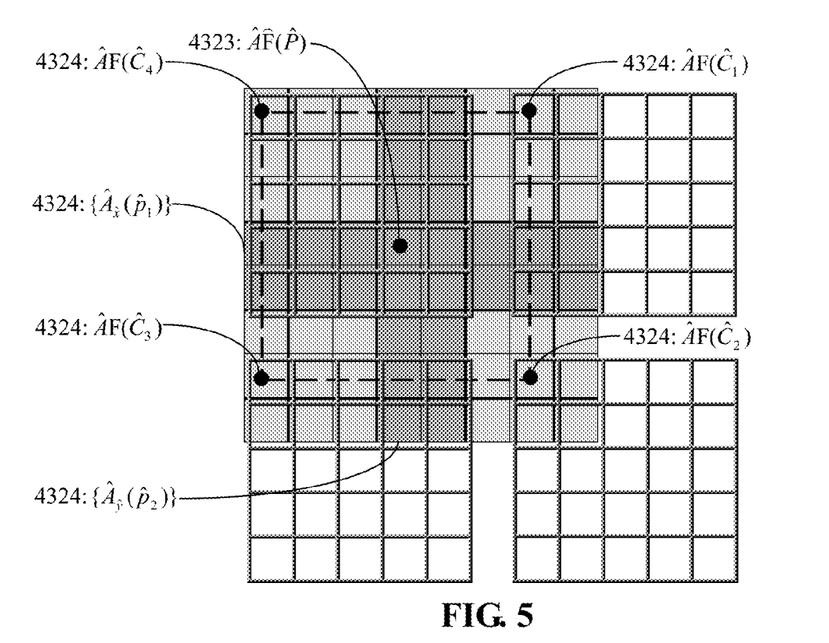
FIG. 5 is an exemplary block diagram in accordance with FIG. 3 adapted for two-dimensions.

For an example as FIG. 5, A is a size of 8×8 with $\dot{P}$ at (4, 4), S is a size of 5×5 with $\dot{S}$ at (1, 1), B is a size of 2×2 with $\dot{B}$ at (1, 1), and F is a size of 7×7 with $\dot{F}$ at (4, 4) and $\dot{C}_1$ at (1, 7), $\dot{C}_2$ at (7, 7), $\dot{C}_3$ at (7, 1), $\dot{C}_4$ at (1, 1) 202; anchoring F to $\dot{P}$ (4, 4) with $\dot{F}$ (4, 4), B to $\dot{P}$ (4, 4) with $\dot{B}$ (1, 1) 4321; correspondingly, arranging the 8×8 A to the 5×5 $\hat{A}$, the $\dot{P}$ (4, 4) to the $\hat{P}$ (3, 3) 4322; pasting every $\hat{C}_k$ to $\hat{A}$ and implementing $\hat{A}\hat{F}$ (3, 3) 4323; thus, further implementing $\hat{A}F(1, 4)$, $\hat{A}F(4, 4)$, $\hat{A}F(4, 1)$ and $\hat{A}F(1, 1)$ (may refer application Ser. No. 12/726,833, page 7-8.), $\{\hat{A}_x(3)\}$ and $\{\hat{A}_y(3)\}$ 4324, where all calculations in detail are shown on FIG. 7.

BRIEF DESCRIPTION OF DRAWINGS

FIG. 6 is an exemplary detailed block diagram in accordance with FIG. 4;

FIG. 7 is an exemplary detailed block diagram in accordance with FIG. 5;

DESCRIPTION OF EMBODIMENT

Suppose that a plaintext A equals "smoother", in which the ASCII code is 73 6d 6f 6f 74 68 65 72, stored in a 8×8 binary matrix as Table 1.

TABLE 1

| ASCII | 73 | 6d | 6f | 6f | 74 | 68 | 65 | 72 |
|---|---|---|---|---|---|---|---|---|
| | 1 | 1 | 1 | 1 | 0 | 0 | 1 | 0 |
| | 1 | 0 | 1 | 1 | 0 | 0 | 0 | 1 |
| | 0 | 1 | 1 | 1 | 1 | 0 | 1 | 0 |
| | 0 | 1 | 1 | 1 | 0 | 1 | 0 | 0 |
| | 1 | 0 | 0 | 0 | 1 | 0 | 0 | 1 |
| | 1 | 1 | 1 | 1 | 1 | 1 | 1 | 1 |
| | 1 | 1 | 1 | 1 | 1 | 1 | 1 | 1 |
| | 0 | 0 | 0 | 0 | 0 | 0 | 0 | 0 |

Suppose that a password equals "Yourlips", in which the ASCII code is 59 6f 75 72 6c 69 70 73. To clearly show the frame effect performed in the plaintext, the password firstly excludes the last digit 3, and secondly forms into octal format to get 26 26 75.65 34 46 61 51 34 07, and thirdly adds 1 to each digit; the positions are shown in as Table 2.

TABLE 2

| ASCII | 26 | 26 | 75 | 65 | 34 | 46 | 61 | 51 | 34 | 07 |
|---|---|---|---|---|---|---|---|---|---|---|
| Row | 3 | 3 | 8 | 7 | 4 | 5 | 7 | 6 | 4 | 1 |
| Column | 7 | 7 | 6 | 6 | 5 | 7 | 2 | 2 | 5 | 8 |

EXAMPLE 1

Frame Functions with Point-Diffusion

Supposes that a medium $$S = \begin{bmatrix} 10011 \\ 01101 \\ 10111 \\ 10010 \\ 11101 \end{bmatrix},$$

$\dot{S}=(1,1)$; a frame F is a size of 7×7 with $\dot{F}$ at (4, 4), and $\dot{C}_1$ at (1, 7), $\dot{C}_2$ at (7, 7), $\dot{C}_3$ at (7, 1), $\dot{C}_4$ at (1, 1).

In addition, reads every diffusion-center in order, if from 1 to 10 on encryption, then from 10 back to 1 on decryption; counts the diffusion-cycle $T=2^{3+1}=16$ times; and further, sets up if 1 time on encryption, then 15 times on decryption.

By math expressions, in encryption, inputs the plaintext A as $A_0$, runs the encryption as $A_0^1, A_1^1, \ldots A_9^1$ and obtains the output as $A_1, A_2, \ldots A_{10}$, thus, to get a ciphertext $A_{10}$; reversely, in decryption, inputs the ciphertext $A_{10}$, runs the decryption as $A_{10}^{15}, A_9^{15}, \ldots A_1^{15}$ and obtains the output $A_9, \ldots, A_1, A_0$, thus, to recover the plaintext A.

When $\dot{F}$ anchors to every $\dot{P}$, by running a frame function with point-diffusion every time, every $\dot{C}_k$ is changed correspondingly; hereinafter, $$\dot{C}_k = \dot{C}_k + \dot{P} - \dot{F},$$

and further, $$A_k^{t+1} = A_k^t \bar{F}(p_1, p_2) = A_k^t F(\dot{C}_1) \oplus A_k^t F(\dot{C}_2) \oplus A_k^t F(\dot{C}_3) \oplus A_k^t F(\dot{C}_4) \oplus \{A_{k_x}^t(p_1)\} \oplus \{A_{k_y}^t(p_2)\}.$$

The details taken from password positions 1, 5 and 10 are shown as below:

Encryption at the $1^{st}$ diffusion-center (3,7):

$$A_0^1 = A\widehat{F}(3, 7) = AF(0, 10) \oplus AF(6, 10) \oplus$$
$$AF(6, 4) \oplus AF(0, 4) \oplus \{A_x(3)\} \oplus \{A_y(7)\}$$

$$= \begin{bmatrix} 0 & 0 & 0 & 1 & 0 & 1 & 1 & 1 \\ 0 & 0 & 1 & 1 & 1 & 1 & 1 & 0 \\ 1 & 0 & 1 & 1 & 1 & 1 & 1 & 1 \\ 0 & 0 & 0 & 0 & 1 & 0 & 1 & 0 \\ 0 & 1 & 1 & 1 & 0 & 0 & 1 & 0 \\ 0 & 0 & 0 & 0 & 0 & 0 & 1 & 0 \\ 1 & 1 & 1 & 0 & 0 & 0 & 1 & 1 \\ 1 & 1 & 1 & 0 & 1 & 0 & 0 & 0 \end{bmatrix} = A_1.$$

Encryption at the $5^{th}$ diffusion-center (4,5):

$$A_4^1 = A_4\widehat{F}(4, 5) = A_4F(1, 8) \oplus A_4F(7, 8) \oplus$$
$$A_4F(7, 2) \oplus A_4F(1, 2) \oplus \{A_{4_x}(4)\} \oplus \{A_{4_y}(5)\}$$

$$= \begin{bmatrix} 0 & 1 & 1 & 0 & 0 & 0 & 1 & 0 \\ 0 & 0 & 1 & 0 & 0 & 0 & 0 & 0 \\ 0 & 1 & 1 & 1 & 1 & 0 & 0 & 1 \\ 1 & 0 & 0 & 1 & 1 & 1 & 1 & 1 \\ 0 & 0 & 0 & 0 & 0 & 1 & 1 & 1 \\ 0 & 0 & 1 & 0 & 1 & 0 & 1 & 1 \\ 0 & 1 & 1 & 1 & 1 & 1 & 0 & 1 \\ 0 & 0 & 0 & 0 & 0 & 1 & 1 & 0 \end{bmatrix} = A_5.$$

Encryption at the $10^{th}$ diffusion-center (1, 8):

$$A_9^1 = A_9\widehat{F}(1, 8) = A_9F(-2, 11) \oplus A_9F(4, 11) \oplus A_9F(4, 5) \oplus$$
$$A_9F(-2, 5) \oplus \{A_{9_x}(1)\} \oplus \{A_{9_y}(8)\}$$

$$= \begin{bmatrix} 0 & 1 & 1 & 1 & 0 & 0 & 1 & 1 \\ 1 & 1 & 1 & 1 & 1 & 0 & 1 & 1 \\ 1 & 1 & 0 & 1 & 0 & 0 & 1 & 0 \\ 0 & 0 & 0 & 1 & 1 & 0 & 1 & 1 \\ 1 & 0 & 1 & 1 & 0 & 0 & 1 & 0 \\ 0 & 1 & 1 & 0 & 0 & 0 & 0 & 0 \\ 1 & 0 & 0 & 0 & 0 & 0 & 1 & 1 \\ 1 & 0 & 1 & 1 & 1 & 0 & 1 & 0 \end{bmatrix} = A_{10}.$$

Decryption at the $10^{th}$ diffusion-center (1, 8):

$$A_{10}^{15} = A_{10}^{14}\widehat{F}(1, 8) = A_{10}^{14}F(-2, 11) \oplus A_{10}^{14}F(4, 11) \oplus A_{10}^{14}F(4, 5) \oplus$$
$$A_{10}^{14}F(-2, 5) \oplus \{A_{10_x}^{14}(1)\} \oplus \{A_{10_y}^{14}(8)\}$$

$$= \begin{bmatrix} 1 & 0 & 0 & 0 & 0 & 1 & 0 & 1 \\ 1 & 1 & 1 & 1 & 0 & 1 & 1 & 0 \\ 1 & 1 & 1 & 0 & 0 & 0 & 0 & 0 \\ 1 & 1 & 1 & 1 & 0 & 0 & 1 & 0 \\ 1 & 1 & 0 & 0 & 0 & 1 & 0 & 0 \\ 1 & 0 & 0 & 1 & 1 & 0 & 1 & 1 \\ 1 & 1 & 1 & 1 & 0 & 0 & 0 & 1 \\ 1 & 1 & 0 & 0 & 0 & 1 & 1 & 1 \end{bmatrix} = A_9.$$

Decryption at the $5^{th}$ diffusion-center (4,5):

$$A_5^{15} = A_5^{14}\widehat{F}(4, 5) = A_5^{14}F(1, 8) \oplus A_5^{14}F(7, 8) \oplus$$
$$A_5^{14}F(7, 2) \oplus A_5^{14}F(1, 2) \oplus \{A_{5_x}^{14}(4)\} \oplus \{A_{5_y}^{14}(5)\}$$

$$= \begin{bmatrix} 0 & 0 & 1 & 1 & 0 & 1 & 0 & 1 \\ 0 & 0 & 1 & 1 & 0 & 1 & 1 & 1 \\ 0 & 0 & 0 & 1 & 0 & 0 & 0 & 1 \\ 0 & 1 & 0 & 1 & 1 & 1 & 1 & 1 \\ 1 & 1 & 0 & 1 & 1 & 0 & 0 & 1 \\ 0 & 0 & 0 & 0 & 1 & 0 & 0 & 1 \\ 0 & 0 & 1 & 0 & 1 & 0 & 0 & 0 \\ 0 & 0 & 0 & 1 & 0 & 1 & 1 & 0 \end{bmatrix} = A_4.$$

Decryption at the $1^{st}$ diffusion-center (3,7):

$$A_1^{15} = A_1^{14}\widehat{F}(3, 7) = A_1^{14}F(0, 10) \oplus A_1^{14}F(6, 10) \oplus$$
$$A_1^{14}F(6, 4) \oplus A_1^{14}F(0, 4) \oplus \{A_{1_x}^{14}(3)\} \oplus \{A_{1_y}^{14}(7)\}$$

$$= \begin{bmatrix} 1 & 1 & 1 & 1 & 0 & 0 & 1 & 0 \\ 1 & 0 & 1 & 1 & 0 & 0 & 0 & 1 \\ 0 & 1 & 1 & 1 & 1 & 0 & 1 & 0 \\ 0 & 1 & 1 & 1 & 0 & 1 & 0 & 0 \\ 1 & 0 & 0 & 0 & 1 & 0 & 0 & 1 \\ 1 & 1 & 1 & 1 & 1 & 1 & 1 & 1 \\ 1 & 1 & 1 & 1 & 1 & 1 & 1 & 1 \\ 0 & 0 & 0 & 0 & 0 & 0 & 0 & 0 \end{bmatrix} = A.$$

EXAMPLE 2

Frame Functions with Block-Diffusion

The Example 1 further joins with a unit-block B, wherein B is a size of 2×2 with $\dot{B}$ at (1, 1); thus, the frame F, arranged by B, with the anchor-point $\hat{F}$ at (3, 3) and the corner-points $\hat{C}_1$ (1, 4), $\hat{C}_2$ at (4, 4), $\hat{C}_3$ at (4, 1), $\hat{C}_4$ at (1, 1); reads every diffusion-center in order, if from 1 to 10 on encryption, then from 10 back to 1 on decryption; counts the diffusion-cycle $T = 2^{2+1} = 8$ times (due to $d_i/b_i = 4 = 2^2$); and further, sets up if 1 time on encryption, then 7 times on decryption.

By math expressions, in encryption, inputs the plaintext A as $A_0$, runs the encryption as $\hat{A}_0^1, \hat{A}_1^1, \ldots \hat{A}_9^1$ and obtains the output as $A_1, A_2, \ldots A_{10}$, thus, to get a ciphertext $A_{10}$; reversely, in decryption, inputs the ciphertext $A_{10}$, runs the decryption as $\hat{A}_{10}^7, \hat{A}_9^7, \ldots \hat{A}_1^7$ and obtains the output $A_9, \ldots, A_1, A_0$, thus, to recover the plaintext A.

When $\dot{F}$ and $\dot{B}$ anchor to every $\dot{P}$, by running a frame function with block-diffusion every time, every $\hat{C}_k$ is changed correspondingly; hereinafter, $$\hat{C}_k = \hat{C}_k + \dot{P} - \dot{F},$$

and further, $$\hat{A}_k^{t+1} = \hat{A}_k^t \widehat{F}(\hat{p}_1, \hat{p}_2) = \hat{A}_k^t F(\hat{C}_1) \oplus \hat{A}_k^t F(\hat{C}_2) \oplus \hat{A}_k^t F(\hat{C}_3)$$
$$\oplus \hat{A}_k^t F(\hat{C}_4) \oplus \{\hat{A}_{k_x}^t(\hat{p}_1)\} \oplus \{\hat{A}_{k_y}^t(\hat{p}_2)\}.$$

$$\hat{A}_0^1 = \hat{A}\widehat{F}(2,4) = \hat{A}F(0,5) \oplus \hat{A}F(3,5) \oplus$$
$$\hat{A}F(3,2) \oplus \hat{A}F(0,2) \oplus \{\hat{A}_{\hat{x}}(2)\} \oplus \{\hat{A}_{\hat{y}}(4)\}$$

$$= \begin{bmatrix} 0 & 0 & 1 & 1 & 0 & 0 & 1 & 0 \\ 0 & 1 & 1 & 0 & 1 & 0 & 0 & 1 \\ 0 & 0 & 0 & 0 & 0 & 0 & 0 & 0 \\ 0 & 0 & 1 & 1 & 1 & 0 & 0 & 1 \\ 1 & 0 & 0 & 0 & 1 & 0 & 1 & 1 \\ 0 & 0 & 1 & 0 & 0 & 0 & 0 & 0 \\ 1 & 0 & 1 & 1 & 0 & 1 & 0 & 0 \\ 1 & 1 & 1 & 0 & 1 & 0 & 0 & 0 \end{bmatrix} = A_1.$$

Encryption at the 5$^{th}$ diffusion-center (4,5):

$$\hat{A}_4^1 = \hat{A}_4\widehat{F}(3,3) = \hat{A}_4F(1,4) \oplus \hat{A}_4F(4,4) \oplus$$
$$\hat{A}_4F(4,1) \oplus \hat{A}_4F(1,1) \oplus \{\hat{A}_{4\hat{x}}(3)\} \oplus \{\hat{A}_{4\hat{y}}(3)\}$$

$$= \begin{bmatrix} 0 & 0 & 1 & 0 & 1 & 1 & 1 & 0 \\ 0 & 1 & 1 & 0 & 1 & 0 & 1 & 1 \\ 1 & 0 & 0 & 0 & 0 & 1 & 1 & 0 \\ 1 & 0 & 1 & 0 & 0 & 0 & 0 & 1 \\ 0 & 1 & 0 & 1 & 1 & 0 & 1 & 0 \\ 0 & 1 & 1 & 1 & 1 & 0 & 1 & 1 \\ 1 & 0 & 1 & 0 & 0 & 0 & 1 & 0 \\ 1 & 0 & 0 & 1 & 1 & 0 & 0 & 0 \end{bmatrix} = A_5.$$

Encryption at the 10$^{th}$ diffusion-center (1,8):

$$\hat{A}_9^1 = \hat{A}_9\widehat{F}(1,5)$$
$$= \hat{A}_9F(-1,6) \oplus \hat{A}_9F(2,6) \oplus \hat{A}_9F(2,3) \oplus$$
$$\hat{A}_9F(-1,3) \oplus \{\hat{A}_{9\hat{x}}(1)\} \oplus \{\hat{A}_{9\hat{y}}(5)\}$$

$$= \begin{bmatrix} 0 & 0 & 1 & 1 & 1 & 1 & 1 & 0 \\ 0 & 0 & 1 & 1 & 1 & 0 & 1 & 1 \\ 0 & 0 & 0 & 1 & 0 & 1 & 0 & 0 \\ 0 & 1 & 1 & 0 & 1 & 1 & 0 & 0 \\ 0 & 1 & 1 & 0 & 1 & 1 & 0 & 1 \\ 1 & 1 & 0 & 0 & 0 & 0 & 1 & 0 \\ 1 & 1 & 0 & 1 & 0 & 0 & 0 & 1 \\ 0 & 1 & 1 & 1 & 0 & 0 & 0 & 0 \end{bmatrix} = A_{10}.$$

Decryption at the 10$^{th}$ diffusion-center (1,8):

$$\hat{A}_{10}^7 = \hat{A}_{10}^6\widehat{F}(1,5)$$
$$= \hat{A}_{10}^6F(-1,6) \oplus \hat{A}_{10}^6F(2,6) \oplus \hat{A}_{10}^6F(2,3) \oplus$$
$$\hat{A}_{10}^6F(-1,3) \oplus \{\hat{A}_{10\hat{x}}^6(1)\} \oplus \{\hat{A}_{10\hat{y}}^6(5)\}$$

$$= \begin{bmatrix} 0 & 0 & 1 & 1 & 1 & 0 & 0 & 0 \\ 1 & 0 & 0 & 0 & 1 & 1 & 0 & 0 \\ 0 & 0 & 0 & 0 & 0 & 1 & 0 & 1 \\ 1 & 0 & 1 & 1 & 0 & 1 & 0 & 1 \\ 0 & 0 & 0 & 1 & 1 & 1 & 1 & 0 \\ 0 & 1 & 0 & 0 & 1 & 1 & 0 & 1 \\ 1 & 0 & 0 & 1 & 0 & 1 & 0 & 0 \\ 1 & 1 & 1 & 1 & 0 & 0 & 0 & 0 \end{bmatrix} = A_9.$$

Decryption at the 5$^{th}$ diffusion-center (4,5):

$$\hat{A}_5^7 = \hat{A}_5^6\widehat{F}(3,3)$$
$$= \hat{A}_5^6F(1,4) \oplus \hat{A}_5^6F(4,4) \oplus \hat{A}_5^6F(4,1) \oplus$$
$$\hat{A}_5^6F(1,1) \oplus \{\hat{A}_{5\hat{x}}^6(3)\} \oplus \{\hat{A}_{5\hat{y}}^6(3)\}$$

$$= \begin{bmatrix} 0 & 1 & 1 & 1 & 1 & 1 & 1 & 1 \\ 0 & 1 & 0 & 0 & 0 & 1 & 1 & 1 \\ 0 & 0 & 1 & 1 & 1 & 1 & 0 & 1 \\ 0 & 0 & 1 & 0 & 1 & 1 & 0 & 1 \\ 1 & 1 & 0 & 0 & 1 & 0 & 0 & 0 \\ 1 & 1 & 0 & 0 & 0 & 1 & 1 & 1 \\ 1 & 1 & 0 & 1 & 1 & 0 & 1 & 1 \\ 1 & 0 & 0 & 0 & 1 & 0 & 0 & 0 \end{bmatrix} = A_4.$$

Decryption at the 1$^{st}$ diffusion-center (3,7):

$$\hat{A}_1^7 = \hat{A}_1^6\widehat{F}(2,4)$$
$$= \hat{A}_1^6F(0,5) \oplus \hat{A}_1^6F(3,5) \oplus \hat{A}_1^6F(3,2) \oplus$$
$$\hat{A}_1^6F(0,2) \oplus \{\hat{A}_{1\hat{x}}^6(2)\} \oplus \{\hat{A}_{1\hat{y}}^6(4)\}$$

$$= \begin{bmatrix} 1 & 1 & 1 & 1 & 0 & 0 & 1 & 0 \\ 1 & 0 & 1 & 1 & 0 & 0 & 0 & 1 \\ 0 & 1 & 1 & 1 & 1 & 0 & 1 & 0 \\ 0 & 1 & 1 & 1 & 0 & 1 & 0 & 0 \\ 1 & 0 & 0 & 0 & 1 & 0 & 0 & 1 \\ 1 & 1 & 1 & 1 & 1 & 1 & 1 & 1 \\ 1 & 1 & 1 & 1 & 1 & 1 & 1 & 1 \\ 0 & 0 & 0 & 0 & 0 & 0 & 0 & 0 \end{bmatrix}$$
$$= A.$$

EXAMPLE 3

Frame Functions with Point-Diffusion and Block-Diffusion

The Example 2 further joins with a switch set Y=[1011011101]; reads every diffusion-center and Y element in order, if from 1 to 10 on encryption, then from 10 back to 1 on decryption; counts the diffusion-cycle, if Y element is 1, then T=$2^{3+1}$=16 times for running with point-diffusions, otherwise, T=$2^{2+1}$=8 times for running with block-diffusions, and further, sets up if 1 time on encryption, then 15 or 7 times on decryption.

By math expressions, in encryption, inputs the plaintext A as $A_0$, runs the encryption as $A_0^1, \hat{A}_1^1, A_2^1, A_3^1, \hat{A}_4^1, A_5^1, A_6^1, A_7^1, \hat{A}_8^1, A_9^1$ and obtains the output as $A_1, A_2, \ldots, A_9, A_{10}$ thus, to get a ciphertext $A_{10}$; reversely, in decryption, inputs the ciphertext $A_{10}$, runs the decryption as $A_{10}^{15}, \hat{A}_9^7, A_8^{15}, A_7^{15}, A_6^{15}, \hat{A}_5^7, A_4^{15}, A_3^{15}, \hat{A}_2^7, A_1^{15}$ and obtains the output $A_9, A_8, \ldots, A_1, A_0$, thus, to recover the plaintext A.

The details taken from password positions 1, 5 and 10 are shown as below:

Encryption at the 1st diffusion-center (3,7): (Y(1)=1, point-diffusion)

$$A_0^1 = A\widehat{F}(3,7)$$
$$= AF(0,10) \oplus AF(6,10) \oplus AF(6,4) \oplus$$
$$AF(0,4) \oplus \{A_x(3)\} \oplus \{A_y(7)\}$$
$$= \begin{bmatrix} 0 & 0 & 0 & 1 & 0 & 1 & 1 & 1 \\ 0 & 0 & 1 & 1 & 1 & 1 & 1 & 0 \\ 1 & 0 & 1 & 1 & 1 & 1 & 1 & 1 \\ 0 & 0 & 0 & 0 & 1 & 0 & 1 & 0 \\ 0 & 1 & 1 & 1 & 0 & 0 & 1 & 0 \\ 0 & 0 & 0 & 0 & 0 & 0 & 1 & 0 \\ 1 & 1 & 1 & 0 & 0 & 0 & 1 & 1 \\ 1 & 1 & 1 & 0 & 1 & 0 & 0 & 0 \end{bmatrix}$$
$$= A_1.$$

Encryption at the 5th diffusion-center (4,5): (Y(5)=0, block-diffusion)

$$\hat{A}_4^1 = \hat{A}_4 \widehat{F}(3,3)$$
$$= \hat{A}_4 F(1,4) \oplus \hat{A}_4 F(4,4) \oplus \hat{A}_4 F(4,1) \oplus$$
$$\hat{A}_4 F(1,1) \oplus \{\hat{A}_{4\hat{x}}(3)\} \oplus \{\hat{A}_{4\hat{y}}(3)\}$$
$$= \begin{bmatrix} 1 & 1 & 1 & 0 & 1 & 0 & 1 & 1 \\ 0 & 1 & 1 & 1 & 1 & 1 & 0 & 1 \\ 0 & 1 & 1 & 0 & 0 & 1 & 0 & 0 \\ 0 & 0 & 1 & 0 & 0 & 1 & 0 & 1 \\ 0 & 0 & 1 & 0 & 1 & 1 & 1 & 1 \\ 1 & 0 & 0 & 0 & 1 & 1 & 0 & 1 \\ 1 & 0 & 0 & 0 & 1 & 1 & 1 & 1 \\ 1 & 0 & 0 & 1 & 1 & 1 & 0 & 1 \end{bmatrix}$$
$$= A_5$$

Encryption at the 10th diffusion-center (1,8): (Y(10)=1, point-diffusion)

$$A_9^1 = A_9 \widehat{F}(1,8)$$
$$= A_9 F(-2,11) \oplus A_9 F(4,11) \oplus A_9 F(4,5) \oplus$$
$$A_9 F(-2,5) \oplus \{A_{9x}(1)\} \oplus \{A_{9y}(8)\}$$
$$= \begin{bmatrix} 0 & 1 & 1 & 0 & 1 & 1 & 1 & 0 \\ 1 & 0 & 0 & 1 & 0 & 1 & 0 & 0 \\ 0 & 1 & 0 & 1 & 0 & 1 & 0 & 0 \\ 1 & 0 & 1 & 1 & 0 & 1 & 1 & 0 \\ 0 & 1 & 0 & 1 & 0 & 1 & 1 & 0 \\ 0 & 0 & 0 & 1 & 1 & 1 & 0 & 1 \\ 0 & 1 & 0 & 0 & 1 & 1 & 1 & 1 \\ 0 & 0 & 1 & 0 & 1 & 1 & 1 & 1 \end{bmatrix}$$
$$= A_{10}$$

Decryption at the 10th diffusion-center (1,8): (Y(10)=1, point-diffusion)

$$A_{10}^{15} = A_{10}^{14} \widehat{F}(1,8)$$
$$= A_{10}^{14} F(-2,11) \oplus A_{10}^{14} F(4,11) \oplus A_{10}^{14} F(4,5) \oplus$$
$$A_{10}^{14} F(-2,5) \oplus \{A_{10x}^{14}(1)\} \oplus \{A_{10y}^{14}(8)\}$$
$$= \begin{bmatrix} 1 & 0 & 1 & 1 & 1 & 1 & 1 & 1 \\ 1 & 1 & 0 & 1 & 0 & 0 & 0 & 0 \\ 1 & 1 & 1 & 0 & 1 & 0 & 1 & 1 \\ 0 & 1 & 1 & 0 & 1 & 0 & 1 & 1 \\ 1 & 1 & 1 & 0 & 1 & 1 & 0 & 0 \\ 1 & 0 & 1 & 0 & 1 & 1 & 0 & 1 \\ 0 & 1 & 0 & 1 & 1 & 1 & 0 & 1 \\ 0 & 0 & 1 & 0 & 1 & 0 & 0 & 1 \end{bmatrix}$$
$$= A_9.$$

Decryption at the 5th diffusion-center (4,5): (Y(5)=0, block-diffusion)

$$\hat{A}_5^7 = \hat{A}_5^6 \widehat{F}(3,3)$$
$$= \hat{A}_5^6 F(1,4) \oplus \hat{A}_5^6 F(4,4) \oplus \hat{A}_5^6 F(4,1) \oplus$$
$$\hat{A}_5^6 F(1,1) \oplus \{\hat{A}_{5\hat{x}}^6(3)\} \oplus \{\hat{A}_{5\hat{y}}^6(3)\}$$
$$= \begin{bmatrix} 1 & 0 & 0 & 0 & 0 & 0 & 1 & 0 \\ 0 & 1 & 0 & 1 & 1 & 1 & 0 & 1 \\ 0 & 1 & 1 & 0 & 0 & 1 & 1 & 0 \\ 0 & 1 & 1 & 1 & 1 & 0 & 0 & 0 \\ 1 & 0 & 0 & 0 & 1 & 1 & 0 & 0 \\ 0 & 0 & 0 & 0 & 1 & 1 & 0 & 0 \\ 1 & 1 & 1 & 1 & 1 & 0 & 1 & 0 \\ 1 & 0 & 0 & 0 & 1 & 0 & 0 & 1 \end{bmatrix}$$
$$= A_4$$

Decryption at the 1st diffusion-center (3,7): (Y(1)=1, point-diffusion)

$$A_1^{15} = A_1^{14} \widehat{F}(3,7)$$
$$= A_1^{14} F(0,10) \oplus A_1^{14} F(6,10) \oplus A_1^{14} F(6,4) \oplus$$
$$A_1^{14} F(0,4) \oplus \{A_{1x}^{14}(3)\} \oplus \{A_{1y}^{14}(7)\}$$
$$= \begin{bmatrix} 1 & 1 & 1 & 1 & 0 & 0 & 1 & 0 \\ 1 & 0 & 1 & 1 & 0 & 0 & 0 & 1 \\ 0 & 1 & 1 & 1 & 1 & 0 & 1 & 0 \\ 0 & 1 & 1 & 1 & 0 & 1 & 0 & 0 \\ 1 & 0 & 0 & 0 & 1 & 0 & 0 & 1 \\ 1 & 1 & 1 & 1 & 1 & 1 & 1 & 1 \\ 1 & 1 & 1 & 1 & 1 & 1 & 1 & 1 \\ 0 & 0 & 0 & 0 & 0 & 0 & 0 & 0 \end{bmatrix}$$
$$= A.$$

Figure 8:
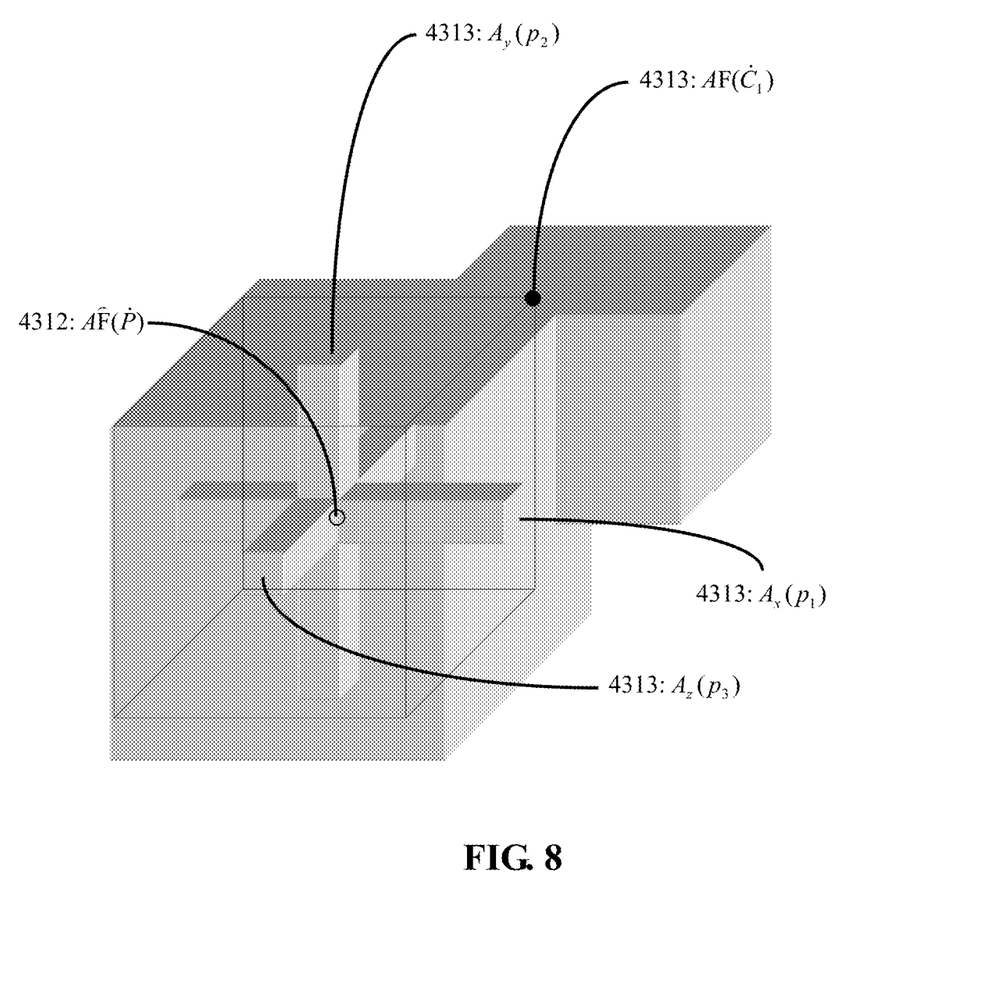
FIG. 8 is an exemplary block diagram in accordance with FIG. 2 adapted for three-dimensions.

From the examples, a two-dimension area is turned into 4 subareas by running a frame function; thus, according to FIG. 8, it is easy to understand that a three-dimension area is then turned into 8 subareas and every subarea, under three-dimensions, is performed a point-diffusion or a block-diffusion (see more detail in application Ser. No. 12/726,833, page 4-6, 9-11); by the same way, the invention is well applied on a variable area of multi-dimensions.

In summation of the above description, the present invention herein complies with the constitutional, statutory, regulatory and treaty, patent application requirements and is herewith submitted for patent application. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer-implemented cryptographic method comprising a plaintext M run by at least one variable module stored in a memory to perform the following steps by a processor:

selecting a n-dimension diffusion-area A, wherein A is a $d_1 \times d_2 \times \ldots \times d_n$ binary matrix and includes a diffusion-center $\dot{P}$ at the coordinates $(p_1, p_2, \ldots p_n)$;

selecting a frame function of point-diffusion $A\overline{F}(\dot{P})$, wherein $$A\overline{F}(\dot{P}) = A\overline{F}(p_1, p_2, \ldots, p_n) = \sum_{k=1}^{2^n} AF(\dot{C}_k) \oplus \sum_{i=1}^{n} \{A_{d_i}(p_i)\};$$

setting a diffusion-cycle T, wherein $T=2^{V-1}$, $V=\lceil \log_2 v \rceil$, and $v = \max(d_1, d_2, \ldots, d_n)$;

letting $T=T_E+T_D$, and the method further comprising steps of:
(a) encrypting M, wherein lets A=M and a ciphertext $C=A\overline{F}(p_1, p_{2_T}^E, \ldots, p_n)$; and
(b) decrypting C, wherein lets A=C and the plaintext $M=A\overline{F}(p_1, p_{2_T}^D, \ldots, p_n)$;

wherein the said encrypting and decrypting steps are run by the said computer-processor.

2. A computer-implemented cryptographic method comprising a plaintext M run by at least one variable module stored in a memory to perform the following steps by a processor:

selecting a n-dimension diffusion-area A, wherein A is a $d_1 \times d_2 \times \ldots \times d_n$ binary matrix and includes a diffusion-center $\dot{P}$ at the coordinates $(p_1, p_2, \ldots p_n)$;

selecting a n-dimension unit-block B, wherein B is a $u_1 \times u_2 \times \ldots \times u_n$ binary matrix and includes an anchor-point $\dot{B}$ at the coordinates $(b_1, b_2, \ldots, b_n)$; letting $\dot{B}$ anchors to $\dot{P}$, wherein A is divided by B into $\hat{A}$ with $\hat{d}_1 \times \hat{d}_2 \times \ldots \hat{d}_n$ and $\dot{P}$ is arranged by B unit to $\hat{P}$ at the coordinates $(\hat{p}_1, \hat{p}_2, \ldots \hat{p}_n)$, wherein $\hat{p}_i = \lceil (p_i-b_i)/u_i \rceil + 1$ and $\hat{d}_i = \lceil (p_i-b_i)/u_i \rceil + \lceil (d_i-p_i+b_i)/u_i \rceil$;

selecting a frame function of block-diffusion $\hat{A}\overline{F}(\hat{P})$, wherein $$\hat{A}\overline{F}(\hat{P}) = \hat{A}\overline{F}(\hat{p}_1, \hat{p}_2, \ldots, \hat{p}_n) = \sum_{k=1}^{2^n} \hat{A}F(\hat{C}_k) \oplus \sum_{i=1}^{n} \{\hat{A}_{\hat{d}_i}(\hat{p}_i)\};$$

setting a diffusion-cycle T, wherein $T=2^{V+1}$, $V=\lceil \log_2 v \rceil$, and $v=\max(\lceil d_i/b_i \rceil, 1 \leq i \leq n)$;

letting $T=T_E+T_D$, and the method further comprising steps of:
(a) encrypting M, wherein lets $\hat{A}=M$ and a ciphertext $C=\hat{A}\overline{F}(\hat{p}_1, \hat{p}_{2_T}^E, \ldots, \hat{p}_n)$; and
(b) decrypting C, wherein lets $\hat{A}=C$ and the plaintext $M=\hat{A}\overline{F}(\hat{p}\times_1, \hat{p}_{2_T}^D, \ldots, \hat{p}_n)$;

wherein the said encrypting and decrypting steps are run by the said computer-processor.

3. A computer-implemented cryptographic method comprising a plaintext M run by at least one variable module stored in a memory to perform the following steps by a processor:

selecting a n-dimension diffusion-area A, wherein A is a $d_1 \times d_2 \times \ldots \times d_n$ binary matrix and includes a diffusion-center $\dot{P}$ at the coordinates $(p_1, p_2, \ldots p_n)$;

selecting a frame function of point-diffusion $A\overline{F}(\dot{P})$, wherein $$A\overline{F}(\dot{P}) = A\overline{F}(p_1, p_2, \ldots, p_n) = \sum_{k=1}^{2^n} AF(\dot{C}_k) \oplus \sum_{i=1}^{n} \{A_{d_i}(p_i)\};$$

selecting a n-dimension unit-block B, wherein B is a $u_1 \times u_2 \times \ldots \times u_n$ binary matrix and includes an anchor-point $\dot{B}$ at the coordinates $(b_1, b_2, \ldots, b_n)$; letting $\dot{B}$ anchors to $\dot{P}$, wherein A is divided by B into $\hat{A}$ with $\hat{d}_1 \times \hat{d}_2 \times \ldots \hat{d}_n$ and $\dot{P}$ is arranged by B unit to $\hat{P}$ at the coordinates $(\hat{p}_1, \hat{p}_2, \ldots \hat{p}_n)$, wherein $\hat{p}_i = \lceil (p_i-b_i)/u_i \rceil + 1$ and $\hat{d}_i = \lceil (p_i-b_i)/u_i \rceil + \lceil (d_i-p_i+b_i)/u_i \rceil$;

selecting a frame function of block-diffusion $\hat{A}\overline{F}(\hat{P})$, wherein $$\hat{A}\overline{F}(\hat{P}) = \hat{A}\overline{F}(\hat{p}_1, \hat{p}_2, \ldots, \hat{p}_n) = \sum_{k=1}^{2^n} \hat{A}F(\hat{C}_k) \oplus \sum_{i=1}^{n} \{\hat{A}_{\hat{d}_i}(\hat{p}_i)\};$$

selecting a switch Y, wherein Y represents for running $A\overline{F}(\dot{P})$ with a first value, $\hat{A}\overline{F}(\hat{P})$ with a second value;

setting a diffusion-cycle $T_1$, wherein $T_1=2^{V+1}$, $V=\lceil \log_2 v \rceil$, and $v=\max(d_1, d_2, \ldots, d_n)$;

setting a diffusion-cycle $T_2$, wherein $T_2=2^{V+1}$, $V=\lceil \log_2 v \rceil$, and $v=\max(\lceil d_i/b_i \rceil, 1 \leq i \leq n)$;

and the method further comprising steps of:
(a) encrypting M, wherein if Y equals said first value, letting $T_1=T_{E1}+T_{D1}$ and A=M, then a ciphertext $C=A\overline{F}(p_1, p_{2_T}^{E1}, \ldots, p_n)$: if Y equals said second value, letting $T_2=T_{E2}+T_{D2}$ and $\hat{A}=M$, then $C=\hat{A}\overline{F}(\hat{p}_1, \hat{p}_{2_T}^{E1}, \ldots, \hat{p}_n)$; and
(b) decrypting C, wherein if Y equals said first value, letting A=C, then the plaintext $M=A\overline{F}(p_1, p_{2_T}^{D1}, \ldots, p_n)$: if Y equals said second value, letting $\hat{A}=C$, then $M=\hat{A}\overline{F}(\hat{p}_1, \hat{p}_{2_T}^{D1}, \ldots, \hat{p}_n)$;

wherein the said encrypting and decrypting steps are run by the said computer-processor.

* * * * *